(12) United States Patent
Ransford et al.

(10) Patent No.: US 6,351,322 B1
(45) Date of Patent: Feb. 26, 2002

(54) Q DETECTION CIRCUIT

(75) Inventors: Michael J. Ransford, Annapolis; Michael G. Taylor, Laurel; Jeffrey C. Livas, Millersville; Vipul Bhatnagar, Kensington; Minh T. Nguyen, Laurel, all of MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/161,978

(22) Filed: Sep. 29, 1998

Related U.S. Application Data

(63) Continuation-in-part of application No. 09/124,092, filed on Jul. 29, 1998, now abandoned.
(51) Int. Cl.[7] .......................... H04B 10/08; H04B 10/18
(52) U.S. Cl. ........................ 359/110; 359/161; 359/177; 359/193; 359/194
(58) Field of Search ................................ 359/161, 193, 359/110, 177, 158, 194

(56) References Cited

U.S. PATENT DOCUMENTS 5,652,668 A * 7/1997 Aulet et al. .................. 359/110
6,008,916 A * 12/1999 Khaleghi ..................... 359/110

OTHER PUBLICATIONS

Neal S. Bergano et al., "Margin Measurements in Optical Amplifier Systems" IEEE Photonic Technology Letters, vol. 5, No. 3, Mar. 1993.

* cited by examiner

*Primary Examiner*—Leslie Pascal
(74) *Attorney, Agent, or Firm*—Daniel N. Daisak; David L. Soltz

(57) ABSTRACT

A testing circuit is provided for determining the Q-factor of an optical communication system. In the testing circuit, a variable attenuator attenuates a received optical signal in response to an attenuator control signal. A first optical-to-electrical converter converts a first portion of the attenuated optical signal into an electrical data signal. A second optical-to-electrical converter converts a second portion of the attenuated optical signal into a first power indication signal. A decision circuit detects high and low data bits in the electrical data signal based on a plurality of threshold voltage signals, and provides decision signals indicative of the results of these determinations. An error monitoring circuit receives the decision signals, determines the bit error rate of the incoming optical signal for the plurality of threshold voltages, and provides bit error rate signals. A microprocessor receives the power regulation signal and the bit error rate signals, and generates a first attenuator control signal and a plurality of threshold voltage signals. In the testing circuit, the variable attenuator operates to attenuate the received optical signal such that it is at an optimal input level for the operation of the first optical-to electrical converter. The microprocessor determines an optimal bit error rate and an optimal Q-factor for the incoming signal based on the bit error rates of the incoming optical signal for the plurality of threshold voltages

16 Claims, 2 Drawing Sheets

Q DETECTION CIRCUIT

This application is a continuation-in-part of application Ser. No. 09/124,092 to a "Q DETECTION CIRCUIT" by Ransford et al., filed Jul. 29, 1998 now abandoned the contents of which are hereby incorporated by reference.

BACKGROUND OF THE INVENTION

1. Field of the Invention

The present invention relates to a method and circuit for measuring the Q-factor of an optically amplified system. More particularly, the present invention relates to a circuit for determining the performance characteristics of a digital, optical waveform.

2. Description of the Related Art

In any transmission system, including optically transmitted systems, it is desirable to know the accuracy of the transmitted data at the receiver, i.e., the end of the system. In a digital system, the transmitted signal comprises a plurality of 1's and 0's, i.e., a plurality of high and low signals. Thus, errors in transmission occur when these 1's and 0's are not properly identified by the receiving circuit.

The digital values "1" and "0" each have an ideal voltage associated with it depending upon the parameters of the transmission circuit. Since no system is completely ideal, however, the actual 1's and 0's being transmitted will run through a range of voltages around the ideal voltages. For this reason, the ideal voltage can also be referred to as a mean voltage $\mu$, since it is the average voltage transmitted for a given digital value. The distribution of these voltages will either be Gaussian or at least a close approximation of Gaussian for the range of interest.

This means that the distribution of voltages transmitted as a particular value, i.e. "1" or "0," will fall into at least an approximation of a Bell curve, as shown in FIG. 1. As shown in FIG. 1, for a given digital value, i.e. "1" or "0," half of the transmitted voltages will fall above the mean voltage $\mu$, half will fall below the mean voltage $\mu$, and a majority will fall within three standard deviations $3\sigma$ of the mean voltage $\mu$.

In a given system, therefore, it is necessary to set some threshold voltages for the 1's and 0's, i.e., HIGH and LOW thresholds, to allow a decision circuit to determine what will be identified as received 1's and 0's. The closer these thresholds are to the mean voltage $\mu$, the greater the error rate will be, and the farther away, the lower the error rate will become.

The accuracy of the transmitted signals can be determined by a statistic called the bit error rate (BER). The BER is the number of errors per bit transmitted, and depends upon the decision threshold. Another indicator of the accuracy of transmission can be given by the transmission's Q-factor. The Q-factor is an indicator of the signal quality at the decision circuit.

While the BER is easy to understand, the Q-factor is generally considered a more useful indicator of the accuracy of a transmission circuit, because it can be used to characterize the signal quality under conditions in which it is not practical to measure the BER. For this reason, it is preferable to determine a circuit's Q-factor rather than its BER. The Q-factor is related to the BER at the optimal threshold setting by the following formula:

$$BER = \frac{1}{2}\text{erfc}\left(\frac{Q}{\sqrt{2}}\right) \approx \frac{1}{2}\left[\frac{1}{(\sqrt{2\pi})Q} \times e^{-\frac{Q^2}{2}}\right] \quad (1.)$$

$$BER \approx \frac{1}{2}\left[\frac{1}{\sqrt{2\pi}} \times \frac{1}{Q} \times e^{-\frac{Q^2}{2}}\right] \quad (2.)$$

As a result, it is possible to determine the Q-factor of a signal by first measuring BER versus threshold for both "1s" and "0s", and then fitting the results to extract the Q-factor.

This relationship is helpful, since the BER is more readily measured than the Q-factor. To measure the BER of a signal a measuring circuit need only monitor an incoming circuit for errors and determine how frequent the errors are. The accuracy of an error count is roughly $\sqrt{N}$, so a rule of thumb is that 10 errors has an uncertainty of 3%.

In conventional optical transmission systems, BERs of $10^{-15}$, i.e., one error per 1,000,000,000,000,000 bits transmitted, are typical. These low BERs lead to one significant problem. Given the small number of errors, it is extremely difficult to actually measure the BER of an optical system in an efficient manner. Since an accurate BER measurement requires the measuring circuit to detect ten individual errors it is necessary to run the measuring circuit for a sufficient period of time for ten errors to pass through. This means that with a BER of $10^{-15}$, the detection circuit would have to actually detect $10^{16}$ data bits before it detected the ten errors required for an accurate BER measurement. For an optical system that can transmit $2.488 \times 10^9$ bits per second (i.e., OC48), it would take nearly $4 \times 10^6$ seconds, or 46 days, for ten errors to be detected, and thus for the BER to be accurately determined.

This is too long a time for any effective testing circuit to employ such a method. As a result, it is extremely difficult to measure the true BERs for the threshold voltages used in optical transmission systems, and thus similarly difficult to determine the systems' Q-factors. It is therefore desirable to have a way of easily determining the BER or Q factor without having to wait over a month for each test sample.

One possible method of estimating BER was suggested in detail in "Margin Measurements in Optical Amplifier Systems," by Neal S. Bergano, et al., IEEE Photonics Technology Letters, Vol. 5, No. 3, Mar., 1993, ("Bergano et al.") the contents of which are herein incorporated by reference. Bergano et al. observes that high values of BER can be easily measured and plotted against their respective threshold voltages. If several measurements are taken of high BER values and plotted against the median voltage on a logarithmic scale, the resulting curve is a close approximation of a straight line. Bergano et al. then suggests plotting one line for the threshold for 1's transmitted through the optical system and another line for 0's transmitted through the optical system.

The point at which these two lines intersect will be the point where the optimal threshold voltage is for marking the difference between 1's and 0's, and will show the BER for that threshold voltage. In this way, the BER can be quickly determined for an ideal threshold voltage, even if the time required to actually confirm that BER would be great. Using Bergano et al.'s method, measurements need only be taken for several larger BER's, which will take a dramatically shorter amount of time.

However, Bergano et al. does not suggest any circuitry for implementing this method, nor does it address the problems inherent in implementing the method into a physical circuit. It is therefore desirable to provide a functional circuit that can provide an accurate reading of the actual BER for both incoming 1's and 0's and accurately extrapolate an optimal threshold voltage and associated BER value for that threshold. It is also desirable to provide a functional circuit that can determine the associated Q-factor for the BER associated with the optimal threshold voltage.

SUMMARY OF THE INVENTION

It is thus an object of the present invention to provide a circuit for determining the Q-factor an optical communication system in an accurate fashion.

In particular, it is an object of this invention to provide a test instrument that will measure the Q-factor of an optical communication system by first determining the optimal BER and threshold voltage of the system, and then using the optimal BER to calculate the optimal Q-factor.

In accordance with these objects, a Q detection circuit is provided, comprising: a first variable attenuator for attenuating a received optical signal in response to a first attenuator control signal, a first optical-to-electrical converter for converting a first portion of the attenuated optical signal into an electrical data signal, a second optical-to-electrical converter for converting a second portion of the attenuated optical signal into a first power indication signal, a decision circuit for detecting high and low data bits in the electrical data signal based on a plurality of threshold voltage signals, and for providing decision signals indicative of the results of these determinations, an error monitoring circuit for receiving the decision signals, determining the bit error rate of the incoming optical signal for the plurality of threshold voltages, and providing bit error rate signals, and a microprocessor for receiving the power regulation signal and the bit error rate signals, and for generating a first attenuator control signal and a plurality of threshold a voltage signals. In this Q-detection circuit, the variable attenuator operates to attenuate the received optical signal such that it is at an optimal input level for the operation of the first optical-to electrical converter. Also, the microprocessor determines an optimal bit error rate and an optimal Q-factor for the incoming signal based on the bit error rates of the incoming optical signal for the plurality of threshold voltages.

A method is also provided for determining the optimal Q-factor of an optical signal containing a plurality of data bits, each of the plurality of data bits having a value of '1' or '0,' the method comprising the steps of: receiving the optical signal, attenuating the optical signal to a desired intensity, converting the attenuated optical signal to an electrical signal, determining the value of each of the data bits for each of a plurality of threshold voltages, determining a 1-bit error rate for identifying bits having a value of '1' in the step of determining the value of each of the data bits, determining a 0-bit error rate for identifying bits having a value of '0' in the step of determining the value of each of the data bits, approximating a 1-bit error line of the logarithm of the 1-bit error rate versus the threshold voltage, approximating a 0-bit error line of the logarithm of the 0-bit error rate versus the threshold voltage, determining an intersection point at which the 1-bit error line and the 0-bit error line cross, determining the ideal bit error rate corresponding to the intersection point, calculating the Q-factor corresponding to the determined ideal bit error rate.

BRIEF DESCRIPTION OF THE DRAWINGS

The above and other objects and advantages of the present invention will become readily apparent from the description that follows, with reference to the accompanying drawings, in which.

DETAILED DESCRIPTION OF THE PREFERRED EMBODIMENTS

Figure 1:
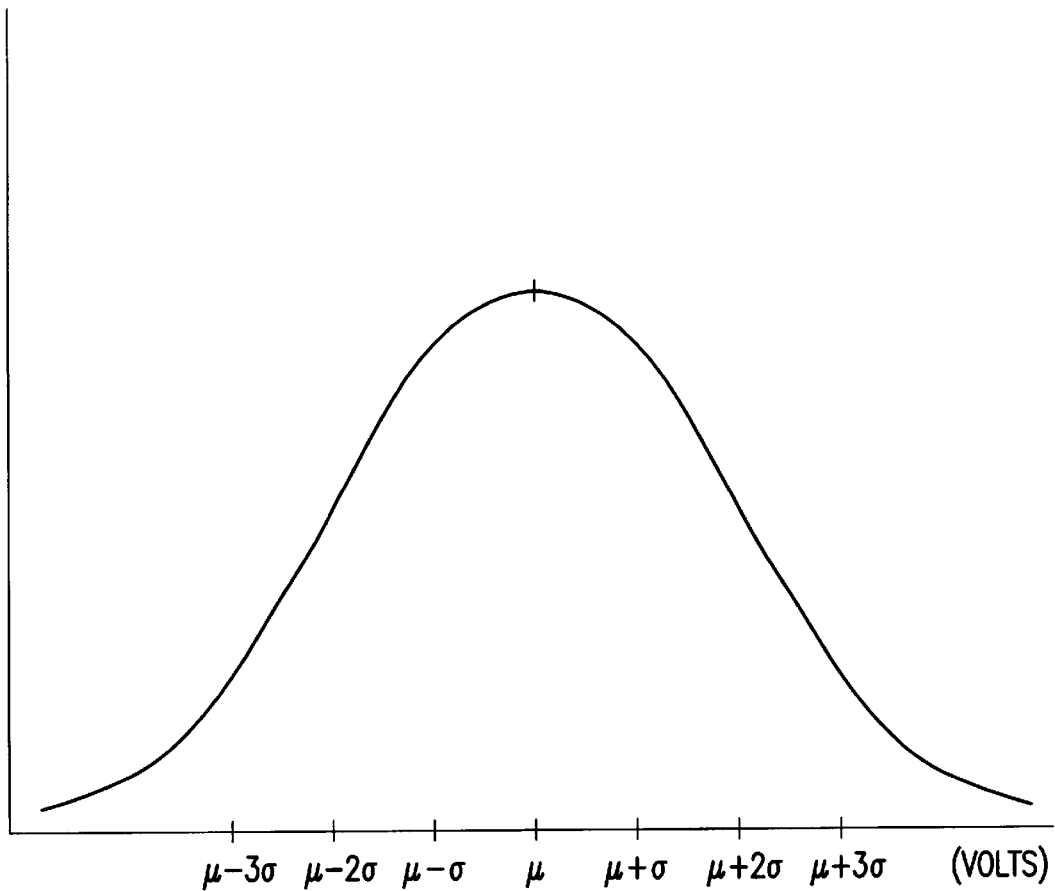
FIG. 1 is graph showing a Gaussian distribution of received voltages around a mean volt for an optical transmission network.
Figure 2:
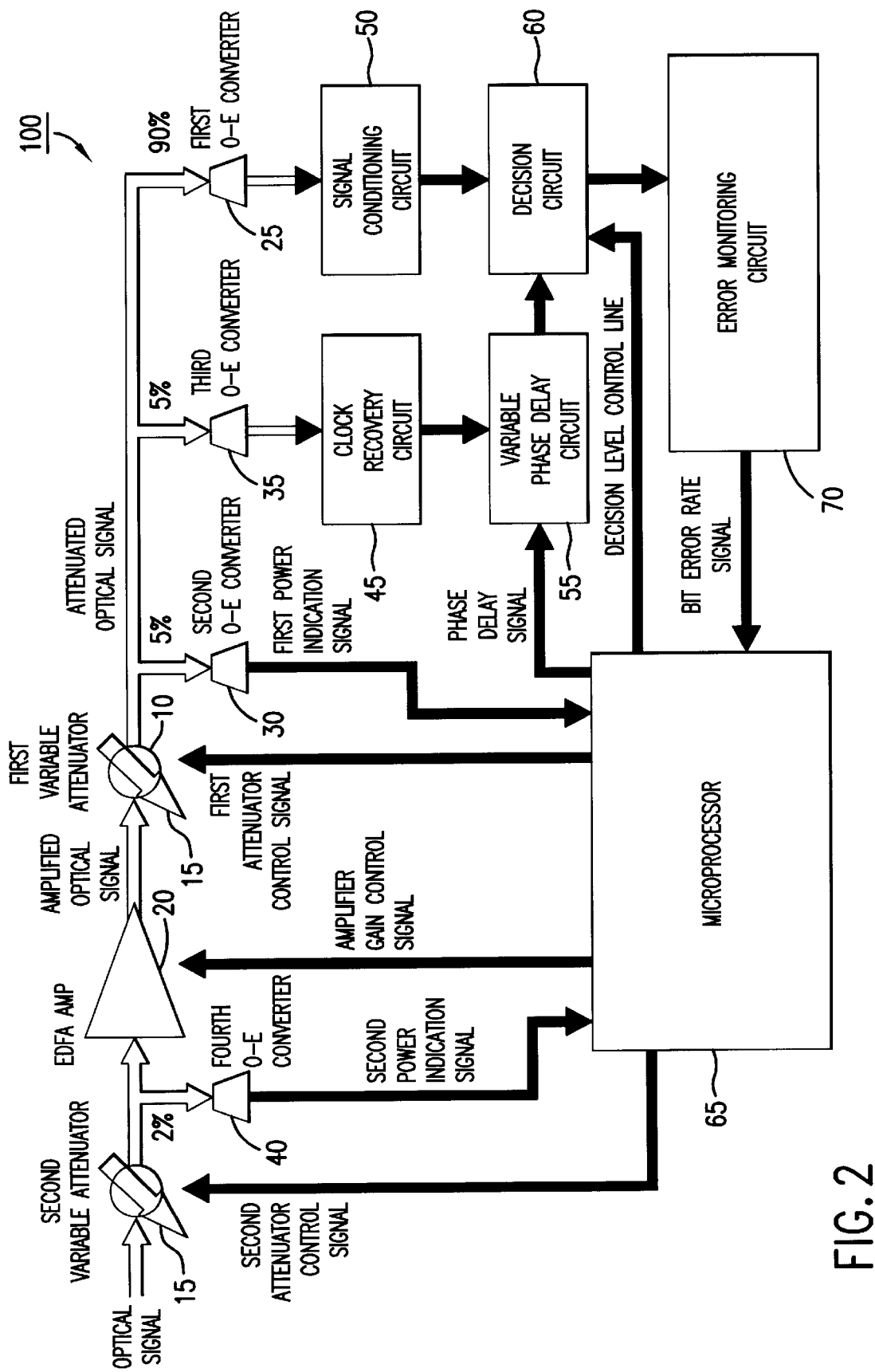
FIG. 2 is a circuit diagram of a testing circuit for determining the Q-factor of an optical communication system according to a first preferred embodiment.

FIG. 2 is a circuit diagram of a testing circuit 100 for determining the Q-factor of an optical communication system according to a first preferred embodiment. This testing circuit 100 first determines the bit error rate (BER) of the circuit and then calculates the related Q-factor based on the determined BER using equation (1) from above. The testing circuit 100 includes first and second variable attenuators 10 and 15, an erbium-doped fiber amplifier (EDFA) 20, first through fourth optical-to-electrical converters 25, 30, 35, and 40, a clock recovery unit 45, a signal conditioning unit 50, a variable phase pulse delay unit 55, a decision circuit 60, a microprocessor 65, and an error monitoring circuit 70. In FIG. 2, the optical path is shown by the hollow lines, while all electrical connections are shown by solid lines.

The testing circuit 100 receives an optical signal over the optical path at the second variable attenuator 15. The fourth optical-to-electrical converter 40 taps 2% of the optical output of the second variable attenuator 15, while the input of the EDFA 20 receives the remaining 98%. The EDFA supplies all of its optical output to the first variable attenuator 10. Of the output of the second optical attenuator 15, 5% is tapped by the second optical-to-electrical converter 30, 5% is tapped by the third optical-to-electrical converter 35, and the remaining 90% is sent to the first optical-to-electrical converter 25.

The optical signal received by the testing circuit comprises a plurality of bits, each having a value of either '1' or '0.' Each of these bits is represented by a signal of varying intensity, with the 1-bits being distributed around an ideal HIGH intensity and the 0-bits being distributed around an ideal LOW intensity. When the optical signal is converted into an electrical signal by the first optical-to-electrical converter 25, these 1-bits and 0-bits are then represented by analog signals comprising a plurality of bits. The plurality of bits each have varying voltages with the 1-bits being distributed around an ideal HIGH voltage and the 0-bits being distributed around an ideal LOW voltage.

The electrical signals received from the first optical-to-electrical converter 25 are adjusted in accordance with the electrical parameters of the signal conditioning circuit 50 and the decision circuit 60. The decision circuit 60 then takes each bit contained in the electrical signal and determines whether each is a '1' or a '0' by comparing the voltage of the bit with a particular threshold voltage at every falling clock edge as determined by the clock recovery circuit 45. If the voltage of the bit is above the threshold voltage, the bit is designated as a '1.' If the voltage of the bit is below the threshold voltage, the bit is designated as a '0.' The threshold voltage of the decision circuit 60 is determined by the microprocessor 65 and is controlled via a threshold voltage control signal sent over the decision level control line.

The closer the threshold voltage is to the ideal HIGH voltage, the more likely the decision circuit 60 is to identify incoming bits as having a value of '0.' This means that for high threshold voltages, the circuit will properly identify most 0-bits, since they will almost all be below the threshold voltage, and will misidentify a larger number of 1-bits as 0-bits, since a larger number of low-range voltages for 1-bits will be below the threshold voltage. In an extreme case, if the threshold voltage were chosen to be equal to the ideal HIGH voltage, an error rate of 0.5 for identifying 1-bits (one error every two bits) would be expected, since half of the 1-bits should have voltages distributed below the ideal HIGH voltage. In addition the error rate for identifying 0-bits would be extremely low, since most 0-bits will have their voltage below the ideal HIGH voltage. This would result in a BER of about 0.5 once the two separate error rates were combined.

A similar argument is applicable for threshold voltages that approach the ideal LOW voltage.

The manner in which the testing circuit 100 actually checks for errors is through the use of a parity bit. The optical signal received along the optical path is preferably a SONET transmission signal, comprising a plurality of SONET packets. Since each packet in a SONET transmission includes a parity bit, it is possible to detect whether there have been an odd number of errors in each packet by monitoring the packet's parity bit. In the testing circuit 100, the error monitoring circuit 70 receives the bits from the decision circuit 60 and categorizes them into SONET packets. The error monitoring circuit 70 then identifies the parity bit in each packet and checks the parity of the packet to determine if it is correct. If not, it then notes the error and sends a notification of that error to the microprocessor 65.

Because of the limited information carried in the parity bit, however, the testing circuit 100 is limited to detecting BERs that are no more frequent than once per SONET packet. If the errors were more frequent, they could not be accurately detected by the parity bit. The parity bit only tells whether there is an odd number of errors in the packet, with no way to discriminate between one error and any other odd number of errors. An even number of errors would result in correct parity, with the errors canceling each other out. In the preferred embodiment, this means that the testing circuit 100 limits itself as an upper BER boundary to testing parameters in which the BER is no greater than $10^{-6}$, or one error per $10^6$ bits, since there are $10^6$ bits in each SONET OC48 data packet.

Although in the preferred embodiment, a SONET data packet is used, and error checking is performed using the parity bit in the SONET data packet, other implementations are certainly possible. A standard pseudo-random pattern may be used for transmission and in this case a full pattern check can be performed to check for errors. This method is limited since now it is necessary to know the content of the full transmitted pattern to check for errors. In comparison, in the preferred embodiment, it is possible to monitor any SONET signal regardless of the data payload.

As to the lower BER boundary, the first preferred embodiment has no physical limits. However, for practical purposes, a software limit can be chosen so that no single error measurement will take more than 40 seconds. Given the data transmission rate, any lower BER would require greater than 40 seconds to detect ten errors, the minimum for a valid BER measurement. Therefore, for the reasons given above, the threshold voltages are chosen to produce bit error rates between $10^{-6}$ and $10^{-11}$. For alternate embodiments, different boundary conditions can obviously be chosen.

The operation of the system of FIG. 2 is as follows. Starting with the decision threshold voltage at the middle point of the voltage range, the threshold voltage is moved up incrementally towards the ideal value of the '1' marker (or the 'mark') until 4 valid points are obtained. A valid point is obtained when the BER is within the acceptable range and at least ten errors are identified within the 40 seconds allowed for each sample.

Then, the threshold voltage is returned to its middle value and the threshold voltage is moved down incrementally towards the ideal value for the '0' marker (or the 'space') until four additional valid points are obtained. Again, a valid point is obtained when the BER is within the acceptable range and at least ten errors are identified within a the 40 seconds allowed for each sample.

These measured points are then plotted on a logarithmic graph and a best-fit line is drawn for each set of points. Based on the BERs computed for the varying threshold voltages, the microprocessor 65 then extrapolates the curves of BER versus threshold voltage for both incoming 1-bits and 0-bits and determines where the two curves cross. The optimal BER and decision threshold voltage for the system are determined by the point where these two lines intersect. The Q-factor is then determined from the optimal BER using equation (1) given above.

Since the function of the circuit is to gain an accurate detection of the BER of an incoming optical signal, it is necessary to minimize as many noise sources as possible within the detection circuit itself. One source of noise can arise from the first optical-to-electrical converter 25. If the signal supplied to the first optical-to-electrical converter 25 is too low, additional noise may be generated that could distort the Q measurement made by the circuit. If the signal is too high, some of the noise may actually be removed by the reconditioning circuit 50. Preferably, the optical signal coming into the first optical-to-electrical converter 25 will be set at a predetermined ideal input level.

The first and second variable attenuators 10 and 15, the EDFA 20, the second and fourth optical-to-electrical converters 30 and 40, and the microprocessor 65 operate to regulate the signal coming into the first optical-to-electrical converter 25 to keep it at the ideal input level. Specifically, the first variable attenuator 10 regulates the output of the EDFA 20 such that the input of the first optical-to-electrical converter 25 is at the ideal input level. Since the first optical-to-electrical converter 25 receives only 90% of the output of the first variable attenuator 10, this means that the EDFA 20 must amplify the incoming signal sufficiently such that 90% of the largest possible output of the first variable attenuator 10 is equal to the ideal input level.

For LOW signals, this is not a problem. However, HIGH signals may bring the EDFA 20 into saturation, causing the introduction of noise to the signal. The circuit solves this problem by having the second variable attenuator 15 reduce the power level of the input signal such that it will not saturate the EDFA 20.

The microprocessor 65 controls the operation of the first and second variable attenuators 10 and 15 and the EDFA 20, using signals received from the second and fourth optical-to-electrical converters 30 and 40. The fourth optical-to-electrical converter 40 taps 2% of the optical signal received from the second variable attenuator 15, converts it to an electrical signal and provides that signal to the microprocessor 65. The microprocessor then uses this signal to control the second variable attenuator 15 and the EDFA 20 via the second attenuator control signal and the amplifier gain control signal to avoid saturating the EDFA 20.

The second optical-to-electrical converter 30 taps 5% of the output of the first variable attenuator 10 and provides it as a signal to the microprocessor 65. The microprocessor 65 uses this signal to adjust the operation of the EDFA 20 and the first variable attenuator 10 to ensure that the signal received at the first optical-to-electrical converter 25 is at the optimal attenuation.

The third optical-to-electrical converter 35, the clock recovery circuit 45, and the variable phase delay circuit 55 operate to provide the decision circuit 60 with a clock signal necessary for it to perform its function. The clock recovery circuit takes the SONET signal received from the third optical-to-electrical converter 35 and converts it into a clock signal. The clock recovery circuit 45 is able to do this since the packets in the SONET signal are sent in a framed pattern with a known frequency. After receiving a clock signal from the clock recovery circuit 45, the variable phase delay circuit 55 offsets the phase of the clock to put it in the proper phase for use by the decision circuit 60.

Although in alternate embodiments a separate clock generator may be used, it is preferable that the incoming signal itself be used for clock generation. Using the incoming SONET signal is both cheaper and more efficient. It is cheaper because it requires a minimum of additional circuitry. It is more efficient because any factors that shift the phase of the data stream will also shift the clock signal in exactly the same manner. This avoids the need for any complicated synchronization circuitry.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation ad illustrated and described. Hence, all suitable modifications and equivalents may be resorted to as falling within the scope of the invention.

What is claimed is:

1. A Q detection circuit, comprising:
a first variable attenuator for attenuating a received optical signal in response to a first attenuator control signal;
a first optical-to-electrical converter for converting a first portion of the attenuated optical signal into an electrical data signal;
a second optical-to-electrical converter for converting a second portion of the attenuated optical signal into a first power indication signal;
a decision circuit for detecting high and low data bits in the electrical data signal based on a plurality of threshold voltage signals, and for providing decision signals indicative of the results of these determinations;
an error monitoring circuit for receiving the decision signals, determining the bit error rate of the received optical signal for the plurality of threshold voltages, and providing bit error rate signals; and
a microprocessor for receiving the power indication signal and the bit error rate signals, and for generating the first attenuator control signal and the plurality of threshold voltage signals,
wherein the first variable optical attenuator operates to attenuate the received optical signal such that it is at an optimal input level for the operation of the first optical-to-electrical converter,
wherein the microprocessor determines an optimal bit error rate and an optimal Q-factor for the received signal based on the bit error rates of the received optical signal for the plurality of threshold voltages.

2. A Q detection circuit as recited in claim 1, wherein the microprocessor determines the optimal bit error rate for the incoming signal by plotting a first line of the bit error rate for determining low signals versus the threshold voltage, plotting a second line of the bit error rate for determining high signals versus the threshold voltage, arid determining the bit error rate corresponding to the point where the first and second lines cross.

3. A Q detection circuit as recited in claim 2, wherein the microprocessor determines the Q factor according to the following equation:

$$BER \approx \left[ \frac{1}{2(\sqrt{2\pi})} \times \frac{1}{Q} \times e^{-\frac{Q^2}{2}} \right].$$

4. A Q detection circuit as recited in claim 1, further comprising a signal conditioning circuit connected between the first optical-to-electrical converter and the decision circuit, for removing noise and adjusting a voltage range of the electrical data signal to a desired voltage range.

5. A Q detection circuit as recited in claim 1, further comprising:
go a third optical-to-electrical converter for receiving a third portion of the attenuated optical signal and providing an electrical clock generation signal; and
a clock recovery circuit for extracting a clock signal from the electrical clock generation signal and providing the clock signal to the decision circuit.

6. A Q detection circuit as recited in claim 5, further comprising a variable phase delay circuit for delaying the phase of the clock signal before it is provided to the decision circuit.

7. A Q detection circuit as recited in claim 1, further comprising:
a second variable attenuator;
an optical amplifier for providing an amplified signal to the first variable attenuator; and
a fourth optical-to-electrical converter for converting a portion of the optical signal attenuated by said second variable attenuator into a second power indication signal,
said microprocessor controlling said second variable attenuator and said optical amplifier based on the second power indication signal to substantially prevent saturation of said optical amplifier.

8. A Q detection circuit as recited in claim 7, wherein the optical amplifier is an erbium-doped fiber amplifier.

9. A Q detection circuit as recited in claim 1, wherein the decision circuit is a high-speed J-K flip flop.

10. A Q detection circuit, comprising:
a first variable attenuator, said first variable attenuator attenuating a received optical signal in response to a first attenuator control signal;
a first optical-to-electrical converter in optical communication with said first variable attenuator, said first optical-to-electrical converter converting a first portion of the attenuated optical signal into an electrical data signal;
a second optical-to-electrical converter in optical communication with said first variable attenuator, said second optical-to-electrical converter converting a second portion of the attenuated optical signal into a first power indication signal;
a decision circuit operatively coupled to said second optical-to-electrical converter, said decision circuit deciding between high and low data bits in the electrical data signal based on a plurality of threshold voltage signals and outputting decision signals indicative of such decisions;

an error monitoring circuit operatively coupled to said decision circuit, said error monitoring circuit determining the bit error rate of the received optical signal at the plurality of threshold voltages and outputting bit error rate signals; and a control circuit operatively coupled to said second optical-to-electrical converter, said error monitoring circuit, and said first variable attenuator, said control circuit receiving the power indication signal and the bit error rate signals, said control circuit generating the plurality of threshold voltage signals, said control circuit generating the first attenuator control signal to control said first variable optical attenuator in order to attenuate the received optical signal to a level that substantially prevents said first optical-to-electrical converter from generating noise, and said control circuit determining a Q-factor for the received signal based on the bit error rate signals for the plurality of threshold voltages.

11. A Q detection circuit as recited in claim 10, further comprising:

a signal conditioning circuit operatively connected to said first optical-to-electrical converter and said decision circuit, said signal conditioning circuit removing noise and adjusting a voltage range of the electrical data signal to a desired voltage range.

12. A Q detection circuit as recited in claim 11, said control circuit generating the first attenuator control signal to control said first variable optical attenuator in order to attenuate the received optical signal to a level that substantially prevents said first optical-to-electrical converter from generating noise and said signal conditioning circuit from removing noise.

13. A Q detection circuit as recited in claim 10, further comprising:

a third optical-to-electrical converter optically coupled to said first variable attenuator, said third optical-to-electrical converter receiving a third portion of the attenuated optical signal and providing an electrical clock generation signal; and a clock recovery circuit operatively coupled to said third optical-to-electrical converter, said clock recovery circuit extracting a clock signal from the electrical clock generation signal and providing the clock signal to said decision circuit.

14. A Q detection circuit as recited in claim 13, further comprising:

a variable phase delay circuit operatively connected to said clock recovery circuit, said variable phase delay circuit delaying a phase of the clock signal provided to said decision circuit.

15. A Q detection circuit as recited in claim 10, further comprising:

a second variable attenuator optically coupled to said optical amplifier;

an optical amplifier optically coupled to said first variable attenuator for providing an amplified signal to the first variable attenuator; and a fourth optical-to-electrical converter optically coupled to and between said second variable attenuator and said optical amplifier, said fourth optical-to-electrical converter converting a portion of the optical signal attenuated by said second variable attenuator into a second power indication signal, said control circuit controlling said second variable attenuator and said optical amplifier based on the second power indication signal to substantially prevent saturation of said optical amplifier.

16. A Q detection circuit as recited in claim 15, wherein said optical amplifier is an erbium-doped amplifier.

* * * * *